INVENTORS
EDWARD T. GETZ
MATTHEW PACAK 3,531,552
METHOD OF MAKING COMPOSITE LOAD SUPPORTING STRUCTURE
Edward T. Getz, Cleveland Heights, and Matthew Pacak, Solon, Ohio, assignors to Eaton Yale & Towne Inc., Cleveland, Ohio, a corporation of Ohio
Original application Apr. 11, 1966, Ser. No. 549,233. Divided and this application May 4, 1967, Ser. No. 662,218
Int. Cl. B29d 9/00
U.S. Cl. 264—45
2 Claims

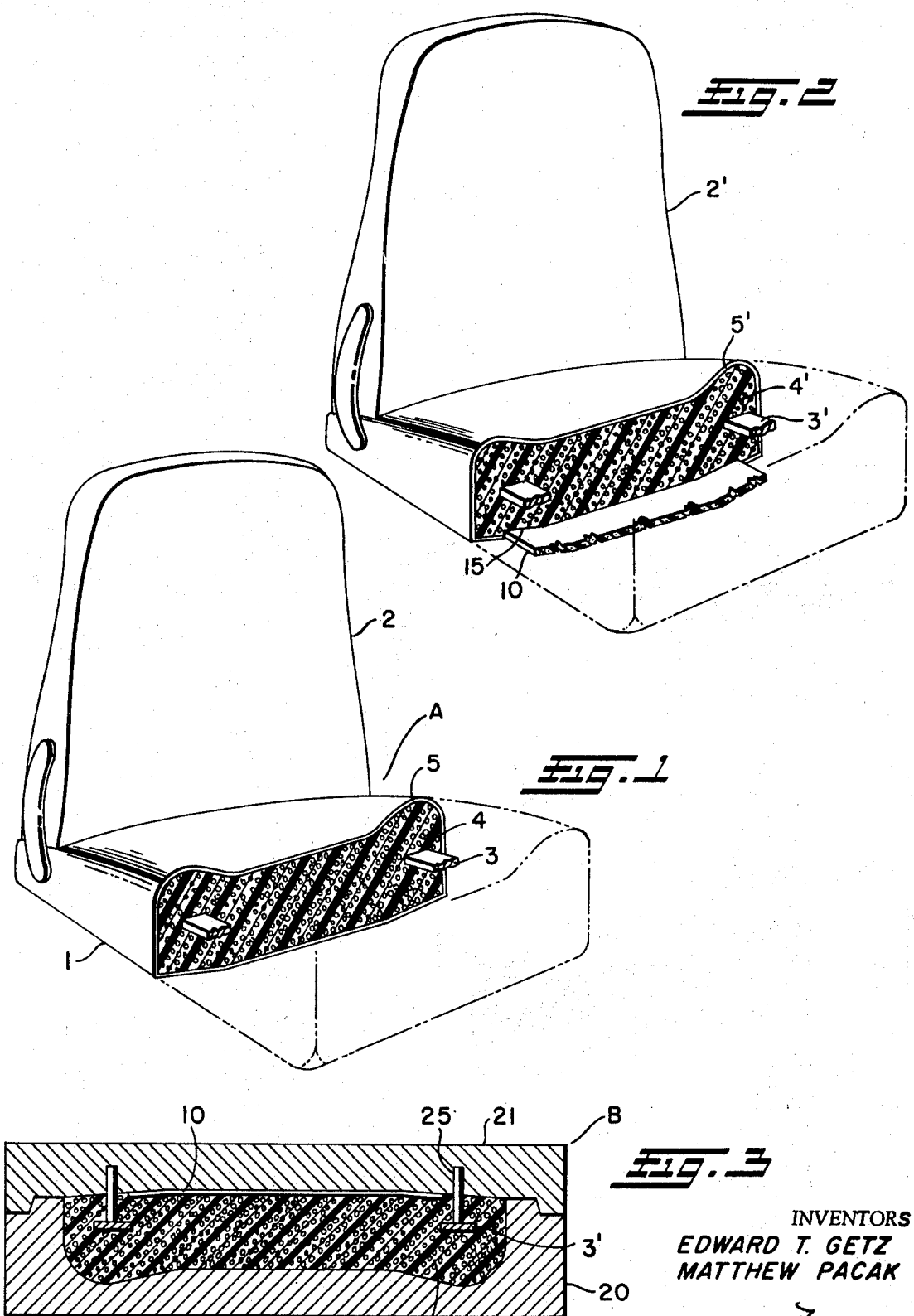

ABSTRACT OF THE DISCLOSURE

Method of molding an integral foam cushion unit including positioning a support frame and a preformed flexible insert in a mold, and dividing the mold with the insert to isolate the mounting means of the frame, and foaming in surrounding relation to the frame and against one side of the insert, absorbing foaming gases into the insert to render the foam free of voids, and producing an interface between the insert and the foam which is tough and of a higher strength to provide reinforcement to the cushion structure.

---

This application is a division of our co-pending application Ser. No. 549,233, filed May 11, 1966.

This invention relates to load supporting structures adaptable for use as vehicle seats, furniture, crashpads, etc., or other cushion devices of this general nature. More specifically, this invention is directed to a composite load supporting structure including a frame and resilient material combined in a manner to provide a new and novel improved load supporting structure.

In the prior art, cushion or seat constructions used as load supporting structures of this general type did not take maximum advantage of the combination of the internal support structure and resilient material making up the cushion or seat. Such devices, for example, contain springs or other flexible members, the flexible members being attached to a frame which is adapted to be carried, for example, in the case of furniture, on the furniture legs, in the case of vehicle seats, on members protruding from the floor of the vehicle. Complicated internal reinforcement arrangements within the cushion constructions were provided for strength and life of the unit. Mounting means would normally have to be attached to the foam cushion unit. Also, the foamed cushion unit had to be covered with appropriate covering material which was usually provided with cover tie-down means such as lines which could be threaded through the unit and tied to specially provided means on the bottom of the unit. To so construct cushion units in these manners requires relatively complicated molding equipment, time consuming and costly manufacturing procedures, and consequence increased cost at a relatively slow production.

It is, accordingly, an object of the present invention to provide a load supporting structure of relatively simple construction including frame means and foamed elastomeric material having a molded contoured surface conforming to the desired shape of the load supporting structure.

It is another object of the present invention to provide a load supporting structure of relatively simple construction, but having extraordinary strength and endurance characteristics including frame means and foamed elastomeric material forming a resilient cushion about the frame means and having a preformed pad molded over a major portion of one face thereof.

Yet another object of this invention is provision of a load supporting structure as noted in the next preceding paragraph wherein the interface between the elastomeric material cushion and the pad is of denser, tougher consistency than either of said cushion or pad to provide a reinforced seat structure with a relatively soft outer surface free of voids or pockets.

Another important object of this invention is to provide a method of molding a composite load supporting structure wherein a frame is placed within a closed mold and a preformed pad is placed between the top surface of the closed mold and the frame so as to absorb the gases formed during the reaction of the foam mixture introduced into the mold and permitting the foam to contact the pad and adhere thereto.

A still further object of this invention is to provide a method of molding a foam cushion unit having offset mounting means attached to the internal frame molded in place by using a preformed pad between the frame and the offset mounting means to preclude the foam from rising into engagement with the offset mounting means.

Another object of the invention is to provide a novel foamed in place wire within the load supporting unit for receiving security means for covering material.

Still further objects of this invention will become apparent upon a reading of the following detailed description of this invention and annexed drawings in which:

FIG. 1 is a perspective view of one load supporting embodiment of this invention in the form of a seat showing the base portion of the seat in section with parts broken away to illustrate the internal construction of the sea.

FIG. 2 is a perspective view of a second load supporting embodiment of this invention in the form of a seat showing the base portion of the seat in section with parts broken away to illustrate the internal construction of the seat.

FIG. 3 is a sectional view of a mold utilized in the method of making the structure of FIG. 2.

Figure 4:
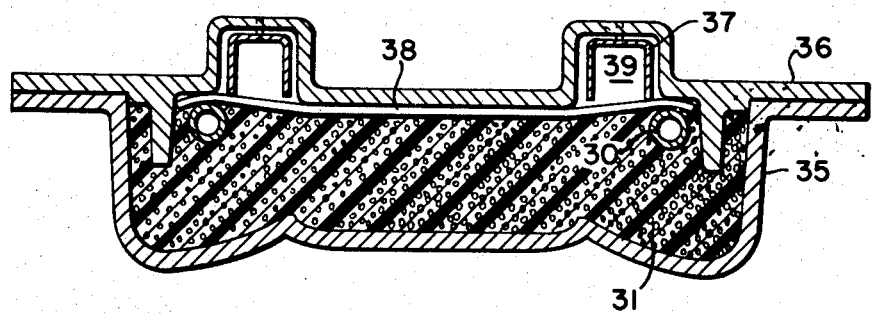
FIG. 4 is a sectional view of a modified method of making the load supporting structure of FIG. 2 using a preformed pad as a closure in the mold.

Before explaining the present invention in detail, it is to be understood that the invention is not limited in its application to the particular construction and arrangement of parts illustrated in the accompanying drawings since the invention is capable of other embodiments and of being practiced and carried out in other various ways. Also, it is to be understood that the phraseology and terminology employed herein is for the purpose of description and not of limitation.

Referring to the drawings, FIG. 1 discloses an illustration of one load supporting embodiment of this invention for a new and novel load supporting construction and particularly, illustrates a bucket-type seat for use in vehicles. It will be obvious that the invention is applicable to other vehicular seat constructions and household furniture such as davenports, couches, chairs and the like. The seat construction shown in FIG. 1 and generally indicated by the letter A comprises a base portion 1 and a back portion 2 for supporting the buttocks and back of the passenger respectively. FIG. 1 illustrates the relationship of the frame or support member 3 which comprises the internal reinforcement surrounded by resilient material 4 which is bonded thereto. A suitable covering or upholstering material 5 is secured tightly around the resilient material for a finished load supporting structure. The frame can be made from flat steel, angle iron or tubular material and is rectangular in shape. The resilient material 4 is a foam rubber, preferably polyurethane foam, or other similar elastomeric or rubber-like foamed material which can be bonded or secured to the frame or support member 3.

While the structure illustrated in FIG. 1 is a simple and flexible design, it has been found through extensive testing by thousands of cycles of load application and release to cushion constructions of this type that the cooperating resilient material and frame or support member provides a cushion construction with the durability required for many applications and yet is of minimum cost. The structure illustrated in FIG. 1 has endured over 100,000 cycles of load application and release in a fatigue or life test. Furthermore, the structure of FIG. 1 has excellent characteristics of comfort and a pleasant "feel" to the person sitting on the structure. Thus, the unexpected performance of the simple load supporting structure of FIG. 1 makes it a highly desirable structure for use in mass production of load supporting units because of its durability, long life, comfort, and flexibility of design. The basic combination of FIG. 1, namely, the foamed resilient material in surrounding relationship to a support or frame member, is readily adaptable to many sizes and shapes of load supporting structures.

FIG. 2 discloses an illustration of another load supporting environment of this invention for a new and novel seat construction which is identical with that of FIG. 1 except for the preformed pad or insert 10 which is molded into one face of the foamed cushion unit. In the seat construction shown in FIG. 2, the insert 10 is preferably cut from a selected polyurethane slab stock and subsequently molded to the resilient foamed material to form a unitary and completed seat construction. The hardness of the composite seat may be varied by a variation of the thickness of the insert 10 relative to the thickness of the resilient material 4' or in varying the relative densities or the physical characteristics of the preformed pad and resilient material 4'. The preformed insert 10 may range in thickness from ¼" to 1" but it has been found that a ¼" thickness is preferable. While molding the insert 10 to the resilient material 4', the wet foam forming the resilient material 4' impregnates the insert 10 and creates a layer at the interface 15 between the insert 10 and resilient material 4' which is denser and tougher than either of said pad or resilient material. Also, the use of the preformed insert 10 ensures a smooth soft surface of the seat because without the insert 10 the air within the mold and gases formed during the foaming of the polyurethane are trapped and cause voids or pockets to be formed in the outer surface of the seat. The preformed pad may be of any suitable material which has the desired characteristics of flexibility and the requisite porosity to permit the wet foam forming the resilient material 4' to impregnate the insert. It has been found that polyether urethane and polyester foams are suitable for the preformed insert 10, but other equivalent materials may be used, such as burlap, or other woven or nonwoven fabrics or materials made of organic or inorganic fibers or filaments. It has been found through extensive testing by thousands of cycles of load application and release to cushion constructions having a preformed insert molded into one face of the cushion that the insert materially improves the durability and load supporting characteristics of the cushion over a cushion or seat construction of resilient material and frame as illustrated in FIG. 1.

While the use of only one insert has been illustrated and described, it is to be understood that this invention encompasses the use of inserts in more than one face of the cushion unit and inserts within the foamed resilient material itself as alternating layers with the foamed resilient material.

Referring to FIG. 3, a mold generally indicated as B utilized in making the composite load supporting structure FIG. 2 as illustrated. The female portion 20 and the cover or lid 21 of the mold B are shown in cross-section. The frame or support means 3' is supported during the molding operation in spaced relationship from the mold cover 21 by any suitable means 25 such as screws, bolts, magnetized pins or the like. The preformed insert 10 is shown in FIG. 3 against the mold lid 21 and supported by the foamed resilient material 4'. With the frame 3' supported in place, the preformed insert 10 is placed on the frame and the polyurethane foam mixture is poured in a liquid state into the mold in a conventional manner on the bottom surface of the mold. The mold is then closed by placing the lid 21 on the mold female portion 20 and securing it in place and allowing the polyurethane foam mixture to react and rise thereby filling the mold with foam. When the mixture reacts and rises, the resulting foam carries the preformed insert 10 from its unsecured position upon the frame 3' to the upper portion of the mold against the mold cover 21 as shown in FIG. 3. An alternative way of effecting placement of the preformed insert 10 in the upper surface of the seat unit as foamed within the mold would be to secure the preformed pad by pin means or other suitable means in place against the mold cover 21 before introduction of the polyurethane foam mixture into the mold. It is to be understood that this invention may be practiced not only with polyurethane foam such as polyether using the one-shot method, but also may be used in conjunction with the polyether urethane prepolymer. After the polyurethane foam mixture has foamed within the mold, the foam mixture is cured and treated by a heating process in the usual manner. Foam articles produced in this manner with the preformed pad were found to be practically free from defects while foams made without the preformed pad possessed considerable irregularities and defects upon removal of the mold lid 21. The resulting interface between the preformed insert 10 and the resilient material comprising the major portion of the seat unit is of denser, tougher consistency than either of the resilient materials of the preformed pad and the seat resilient material 4'. This denser, tougher interface provides a reinforced seat structure with a relatively soft outer surface. Test results have shown that the seat structure made with a preformed pad and its resulting denser, tougher interface provides an unexpected degree of strength and durability to the composite load supporting structure of FIG. 2 which makes this structure even more adaptable to various seating requirements and load supporting needs than the simpler structure of FIG. 1.

FIG. 4 illustrates another embodiment of the composite load supporting structure of this invention utilizing the preformed pad and mounting means for the structure molded in place. In the FIG. 4 embodiment, tubular stock 30 is used as the frame or support means for the surrounding resilient material 31. It is to be understood that the resilent material 31 can be polyurethane foam such as polyether or a polyether prepolymer as was the case for the foamed resilient material 4' of FIGS. 2 and 3. The remale portion of the mold of FIG. 4 has the cross-sectional shape of the desired load supporting unit and the lid 36 has a shape which provides for accommodation of the mounting feet means 37 which are integral with the frame 30. The integral frame mounting feet 37 are desirable for providing means integral with the finished load supporting unit which can be readily mounted in adjusting tracks or guide rails in an automobile on which seats are customarily mounted to provide for adjustment of the seat relative to the steering wheel to accommodate drivers of different size as is well known. The embodiment of FIG. 4 is formed and molded in the same manner as described above regarding the FIG. 3 embodiment with the exception that the preformed pad or insert 38 of the FIG. 4 embodiment is not floated by the resulting foam to the top of the mold but rather is mounted in place against the mold lid between said lid and the frame rail 30. The preformed insert 38 plays an essential part during the molding of the FIG. 4 embodiment as a closure in that it isolates the mounting feet 37 and the frame 30 in opposite cavities of the mold and precludes the resulting foam from rising into the hollow portions 39 of the frame mounting feet 37. The preformed insert 38 may be of varying thickness and physical characteristics, but it has been found that a ¼" thickness is preferable. The use of the preformed insert 38 ensures a smooth, soft surface of the seat because without the pad 38 the air within the mold and gases formed during the foaming of the polyurethane are trapped and cause voids or pockets to be formed in the outer surface of the seat. Thus, the use of the preformed slab ensures a load supporting structure having an acceptable surface free of voids or splits or air pockets and a stronger foam section, and confines the foam to the desired shape.

While the illustrated embodiments of FIGS. 2-4 of this invention have illustrated the preformed pad as molded in the bottom surface of the load supporting unit, it is to be understood that the preformed pad could be molded into any surface of the load supporting unit including the top surface and even in both the top and bottom and surfaces simultaneously if it were so desirable and advantageous. Furthermore, the invention is not confined to any particular shape or configuration of the preformed pad which could be made to any size, shape or configuration, to suit any particular needs.

Figure 5:
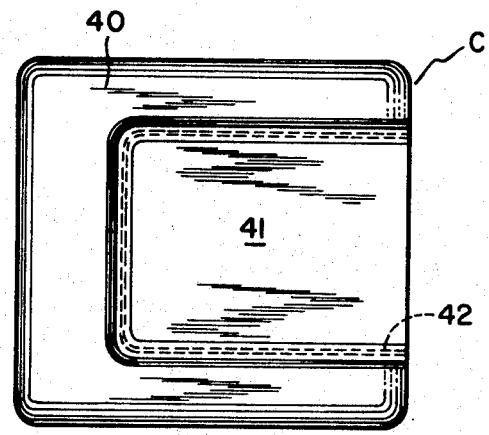
FIG. 5 is a plan view of a modified form of a load supporting structure of this invention.
Figure 6:
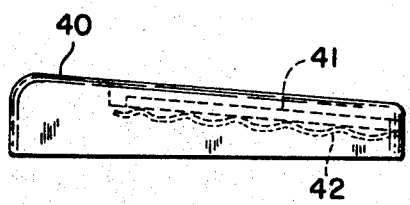
FIG. 6 is a side elevational view of FIG. 5.

FIGS. 5 and 6 illustrate an adaptation of the present invention to a particular style of seat namely, a bucket vehicle seat. The bucket seat generally indicated as C has a bolstered area 40 which is generally uplifted or offset from a lower central seating area 41. A wire 41 is molded in place in the seat unit C at the junction of the bolster area 40 and the central seating area 41. The bolster wire is molded in place near the surface of the seating area 41. In covering the seat unit C with a covering material or upholstery, it is a simple matter to "hog-ring" or otherwise attach the covering material to the molded in place wire within the seat unit. This arrangement for attaching the covering material to the molded seat unit is extremely expedient for production needs and cost saving over the conventional method of hand-threading a wire or other means attached to the underside of the seat unit through integral loops attached to the underside of the covering material. The use of the molded in place cover tie-down wire 42 is adaptable to any molded foam seat design. For example, in another model seat design having a generally level surface contour, parallel tie-down wires are extended longitudinally near the lateral edges of the foamed seat for receiving attaching means for securing the covering material. The molded in place cover tie-down wire can be of any desired shape or configuration, but in the embodiment illustrated in FIGS. 5 and 6, it is an undulated wire of an open rectangular shape. The lower portions of the undulated wire serve as anchoring means for the upper portions of the wire to which the cover tie-down material is attached.

While the invention has been described for particular use within the base portion of a seat, it is to be understood that the invention could be utilized in the back portion of a seat as in the back portion 2 as illustrated in FIG. 1, or in a bench type seat often utilized in the rear seat of an automobile.

It should be understood that the preferred embodiment of the present invention has been described herein in great detail and that certain modifications and changes may be made by those skilled in the art to which it relates and it is intended to cover hereby all changes, adaptations and modifications falling within the scope of the appended claims.

Having described our invention, we claim:

1. A method of molding an integral foam cushion unit comprising:
    placing a support frame for the unit, having mounting means connected thereto, in a mold cavity with said frame in spaced relationship to at least one surface of said mold cavity,
    placing an upholstery tie wire in said mold cavity adjacent to said support frame,
    placing a preformed flexible, porous polyurethane insert having two sides adjacent to said frame to divide said cavity into first and second cavity portions with said mounting means positioned in one cavity portion and said frame in the other cavity portion,
    introducing a polyurethane foam mixture beneath said insert,
    foaming said mixture, thereby filling said other cavity portion with foam in surrounding relationship to said frame and against one side of said insert, isolating said mounting means from said foam with said insert, absorbing foaming gases into said insert, impregnating said insert on one surface with said foam,
    curing said foam to cohesively secure said foam, frame and preformed insert together to provide a reenforced seat structure with a relatively soft outer surface free of voids or pockets, and
    covering said molded foam structure with an upholstery covering material, and securing said covering material to said tie wire by passing attaching means around said wire and into attaching engagement with said covering material.

2. The method of molding an integral foam cushion as set forth in claim 1 wherein:
    said wire is undulated and including embedding the lower portions in place within said foam, and securing said covering material to the upper portions of said wire.

References Cited

UNITED STATES PATENTS

| 2,838,100 | 6/1958 | Follows | 264—45 |
| 3,112,987 | 12/1963 | Griffiths | 264—45 |
| 3,204,016 | 8/1965 | Sanger et al. | 264—45 |
| 3,239,584 | 3/1966 | Terry et al. | 264—45 |
| 3,264,382 | 8/1966 | Angell et al. | 264—45 |
| 3,273,179 | 9/1966 | Ridenour | 264—45 |

FOREIGN PATENTS 664,192  6/1963  Canada.

JULIUS FROME, Primary Examiner

L. GARRETT, Assistant Examiner

U.S. Cl. X.R.
264—54; 297—452